US009832417B2

(12) United States Patent
Hailey

(10) Patent No.: US 9,832,417 B2
(45) Date of Patent: Nov. 28, 2017

(54) MEDIA REGISTRATION AND AUTHORIZATION ON A MEDIA PLAYER

(75) Inventor: James Edwin Hailey, Indianapolis, IN (US)

(73) Assignee: Thomson Licensing (FR)

( * ) Notice: Subject to any disclaimer, the term of this patent is extended or adjusted under 35 U.S.C. 154(b) by 611 days.

(21) Appl. No.: 13/639,979

(22) PCT Filed: May 18, 2010

(86) PCT No.: PCT/US2010/001471
§ 371 (c)(1),
(2), (4) Date: Oct. 8, 2012

(87) PCT Pub. No.: WO2011/146040
PCT Pub. Date: Nov. 24, 2011

(65) Prior Publication Data
US 2013/0039637 A1    Feb. 14, 2013

(51) Int. Cl.
| H04N 9/80 | (2006.01) |
| H04N 5/93 | (2006.01) |
| G11B 27/00 | (2006.01) |
| H04N 5/76 | (2006.01) |
| H04N 21/426 | (2011.01) |
| H04N 21/454 | (2011.01) |
| H04N 21/475 | (2011.01) |
| H04N 5/765 | (2006.01) |
| H04N 5/775 | (2006.01) |
| H04N 5/85 | (2006.01) |
| H04N 9/82 | (2006.01) |

(52) U.S. Cl.
CPC ......... *H04N 5/76* (2013.01); *H04N 21/42646* (2013.01); *H04N 21/4542* (2013.01); *H04N 21/475* (2013.01); *H04N 5/765* (2013.01); *H04N 5/775* (2013.01); *H04N 5/85* (2013.01); *H04N 9/8205* (2013.01)

(58) Field of Classification Search
USPC .................................................. 386/278–283
See application file for complete search history.

(56) References Cited

U.S. PATENT DOCUMENTS

| 2001/0037459 A1 | 11/2001 | Ogawa et al. |
| 2003/0014750 A1 | 1/2003 | Kamen |
| 2003/0014751 A1 | 1/2003 | Pack |
| 2005/0060552 A1 | 3/2005 | Sugimura et al. |
| 2007/0150918 A1 | 6/2007 | Carpenter et al. |
| 2007/0183746 A1 | 8/2007 | Haeuser |

(Continued)

FOREIGN PATENT DOCUMENTS

| CN | 1606009 | 4/2005 |
| CN | 101341718 | 1/2009 |
| EP | 1523186 | 4/2005 |

(Continued)

OTHER PUBLICATIONS

International Search Report dated Feb. 4, 2011.

*Primary Examiner* — Nigar Chowdhury
(74) *Attorney, Agent, or Firm* — Jack Schwartz & Associates, PLLC

(57) ABSTRACT

The disclosed methods and systems provide for the registry and authorization of media on a media player. The method involves maintaining a registry of registered media. Media to be played by the media player is compared to the maintained registry of registered media. If media is registered, authorization it then required to play the registered media.

20 Claims, 5 Drawing Sheets

(56) References Cited

U.S. PATENT DOCUMENTS

2007/0212025 A1 9/2007 Barton et al.
2012/0054789 A1 3/2012 Evans et al.

FOREIGN PATENT DOCUMENTS

| EP | 1630808 | 1/2008 |
| JP | 2001268510 | 9/2001 |
| JP | 2002112181 | 4/2002 |
| JP | 2006107556 | 4/2006 |
| JP | 2007088896 | 4/2007 |
| JP | 2001202748 | 7/2007 |
| JP | 2009219071 | 9/2009 |
| JP | 2009528786 | 8/2014 |
| WO | 2007073422 | 6/2007 |

MEDIA REGISTRATION AND AUTHORIZATION ON A MEDIA PLAYER

This application claims the benefit, under 35 U.S.C. §365 of International Application PCT/US10/01471, filed May 18, 2010, which was published in accordance with PCT Article 21(2) on Nov. 24, 2011 in English.

BACKGROUND

Technical Field

This invention relates to the field of media players. More particularly, this invention relates to the ability to register a media with a player wherein registered media requires authorization to be played by the player.

Description of Related Art

The ratings for content of media such as DVDs and Blu-ray discs can range from "G" to "X", while some content is not rated at all (NR). A family with children may have several "G" or "PG" rated DVDs or Blu-ray discs which are frequently viewed and can be loaded into a player and played by the children, sometimes without adult supervision. However, the adults may also rent or own DVDs or Blu-ray discs which are inappropriate for children that can be accidently or intentionally loaded and played by the children.

Even though media players such as DVD or Blu-ray players typically have parental control features to prevent content with a certain rating from being viewed, it is typically not used due to the set-up complexity and the broad range of content within a single rating category. For example, some movies are rated "PG" or "PG13" but may still contain some level of profanity, nudity, or violence that may be objectionable for children. Additionally, some families may have DVDs, Blu-ray discs or other media in their library that have controversial subject matter that they do not wish certain members of the family to view.

Since some media can contain subject matter that is inappropriate despite its rating, it is advantageous to be able to control which media is playable based on the media itself and not the rating of the media.

SUMMARY

In accordance with one embodiment, a method is provided for authorization of the playing of media based on the registry of the media. This involves maintaining a registry of registered media. Media to be played may then be compared to the maintained registry of registered media. If media is registered, authorization is then required to play the registered media.

With this methodology media such as DVD or Blu-ray discs containing objectionable content can be prevented from playing independently of the rating of the media.

In accordance with another embodiment, a media system is provided for the authorization of the playing of media based on the registry of the media. The system involves a reader, a processor, storage and an output interface. The reader is configured to read media for playing by media player. The processor is configured to maintain a registry of registered media, compare media to the maintained registry of registered media, and require authorization to play registered media. The storage is for storing the maintained registry of registered media. The output interface is configured to output the content of an authorized media.

In accordance with another embodiment, a method is provided for registering media with a media player. First, a selection of media to be registered is received. Then the received selected media is registered. Once registered, authorization is required to play the registered media.

DETAILED DESCRIPTION

The methodologies, systems and teachings disclosed herein can be embodied in media player that is capable of having media registered with the player. Once media is registered, authorization is required to play the registered media.

In the examples described herein, the term "media" is used refer the storage means used for the distribution of content. The term "media" is meant to include all such storage mediums or used for storage and distribution of content as well as the data files provided on such storage mediums. Thus "media" can includes optical storage devices such as DVDs or Blu-ray discs; memory devices such as thumb flash drives; and media files such as MP4, QuickTime, Windows Media files or the like. The term "media player" refers to the devices that are configured to play "media." This can include devices that read physical media such as DVD or Blu-ray players; other devices that can download, store, stream, or otherwise play media files, such as Apple TV, Roku set top box, Vudu set top box, IPod, or Zune media player. A "media player" can also be implemented in software, such as the applications QuickTime and Windows media player.

Figure 1A:
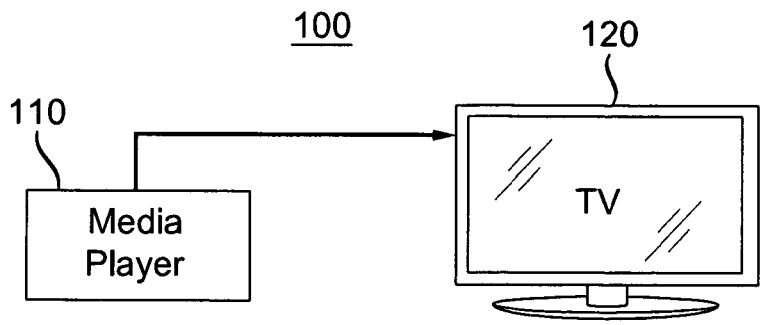
FIG. 1A is a diagram depicting an embodiment of a DVD system typically operated and viewed from one location.

FIG. 1A depicts one environment 100 in which a media player with the functionality described herein can be employed. At its heart is a media player 110. In this embodiment, the media player 110 is a set top box, such as a DVD player. The media player 110 is connected to a user's display device and/or audio system 120 such as a television. The connection between the media player 110 and the television can be a coaxial, RCA, HDMI or other type of audio visual (AV) connection.

In the embodiment of FIG. 1A the media player 110 is a set top box designed to be connected to a user's display device and audio system 120 such as a television and stereo system for outputting media content. However, in other embodiments, the media player 110 can be a stand-alone device that includes its own video and audio reproduction capabilities, which does not need to be connected to a user's display device and/or audio system 120.

Figure 1B:
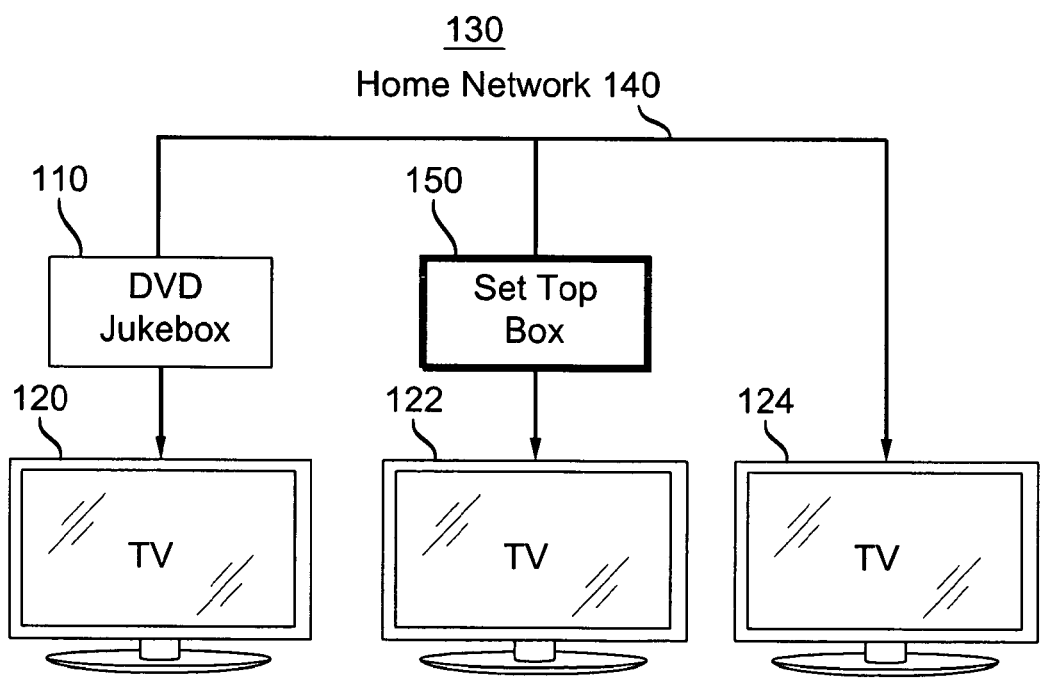
FIG. 1B is a diagram depicting an embodiment of a MEDIA system that may be operated from operated from more than one location and may distribute content to more than one location.

FIG. 1B depicts another environment 130 in which a media player with the functionality described herein can be employed. In this example the media player 110 is part of a home network 140. For example, the media player 110 could be implemented as networked DVD Jukebox. In this example, the networked DVD Jukebox 110 is connected to multiple display devices and/or audio systems 120, 122, 124.

In the example of FIG. 1B, the media player 110 is connected to the first display device and/or audio system 120 in a conventional manner such as described in FIG. 1A. The media player 110 is connected to the second 122 and third 124 display devices and/or audio systems over a home network 140. In the depicted system the second display device 122 is interfaced with the home network 140 using a set top box 150 while the third display device 124 is connected directly to the home network 140. In the case of the second display device 122, the set top box 160 is connected to second display device 122 in a conventional manner using a coaxial, RCA, HDMI, or other AV connection and connected to the DVD 110 using a network connection. In the case of the third display device 124, a conventional coaxial, RCA, HDMI, or other AV connection is not used as the third display device 124 has a network connection. Examples of suitable networks include Ethernet or multimedia over coaxial (MoCa) networks. Other types of suitable home networks will be apparent to one skilled in the art given the benefit of this disclosure. In this configuration, for the remotely located display device 122 and 124, the commands to control the DVD 110 are received by the set top box 150 or display device 124 and are conveyed to the DVD 110 over the home network 140.

Figure 2:
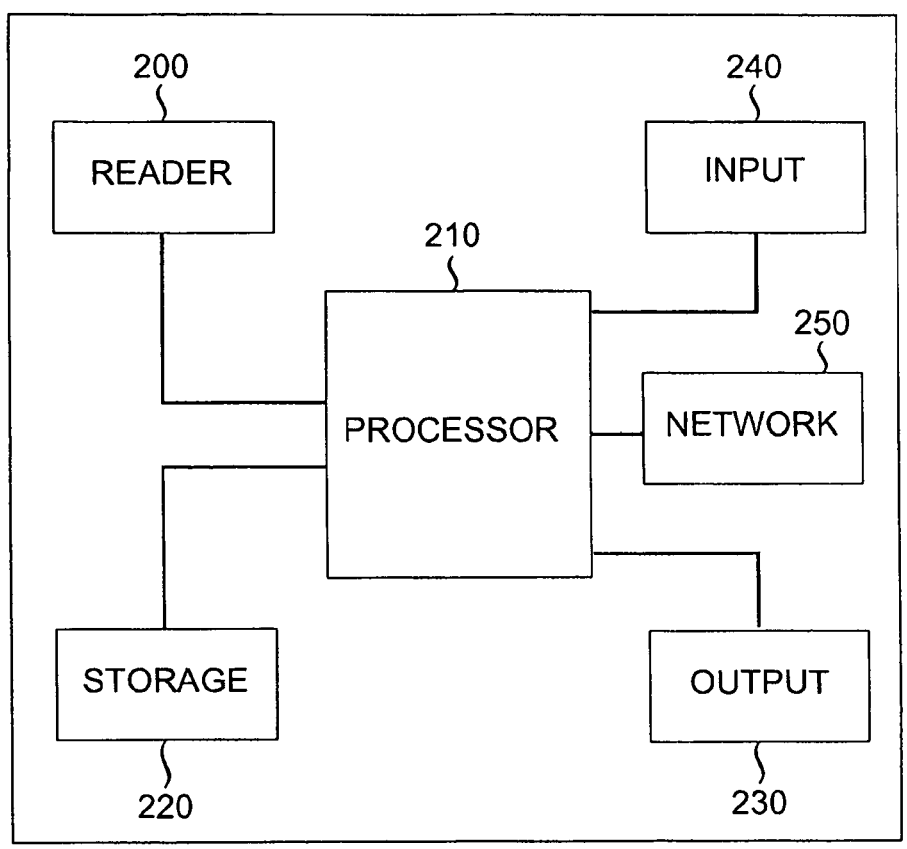
FIG. 2 is a block diagram useful depicting the elements of a system in accordance with one embodiment.

FIG. 2 is a block diagram depicting the elements of media player 110 in accordance with one embodiment. In this embodiment, the media player 110 comprises a reader 200, a processor 210, storage 220, and an output interface 230. In some embodiments, the consumer electronics device can further include an input interface 240 and a network interface 250. Each of these elements will be discussed in more detail below.

The reader 200 is configured to access, read, and/or decode the media. The type and configuration of the reader 200 depends on the format of the media. As such, the reader 200 can be configured to read physical media such as DVDs and decode the media files provided on the physical storage. In other embodiments, wherein media files are obtained without the use of a physical storage device, such as downloaded media files, the reader decodes the media files. In certain embodiments, the reader 110 is able to access, read, and/or decode different types of media. For example, the media player may be able to play blu-ray discs and DVDs as well as stream media over a network. In such a case, the reader 200 is able to access, read, and/or decode media files from all those sources.

The processor 210 controls the operation of the media player 110. The processor 210 runs the software that operates the media player 110 as well as provides the functionality of registry and authorization. This includes maintaining a registry of registered media, and requiring authorization to play registered media. The processor 210 is connected to the receiver 200, storage 220, output interface 230, and, in some embodiments, input interface 240 and network interface 250, and handles the transfer and processing of information between these elements. The processor 210 can be general processor or a processor dedicated for a specific functionality. In certain embodiments there can be multiple processors.

The storage 220 is where the software and other information used by the consumer electronics device are stored. The storage 220 can include volatile memory (RAM), non-volatile memory (EEPROM), magnetic media (hard drive), optical media (CD/DVD-Rom), or flash based storage. In certain embodiments the storage 220 will typically include memory as well as large capacity storage such as a hard-drive.

The output interface 230 is configured to provide the media in the correct format for outputting on a video display or audio device 120. The proper format can include the codec for the content to be output as well as the connector type used to connect to an external video display device or audio device or in some embodiments, the onboard display or speakers. The output interface 230 can also provide the graphics and menus used to access the media and provide information about the media.

In some embodiments the media player 110 can further include an input interface 240. The user interface 240 allows the user to interact with the media player 110. The user interface 240 also allows for the selection of media for playback and the entering of authorization for the display of registered media. The user interface 240 can also handle the interfacing with the various devices that can be used to input information, such a remotes, keyboards, etc.

In certain embodiments the media player 110 also includes a network interface 250. The network interface handles the communication of the media player 110 with other devices over a network. This can include devices in a home network 140 such as seen in FIG. 1B or internet devices outside the home network 140. Examples of suitable networks include Ethernet or multimedia over coaxial (MoCa) networks. Other types of suitable home networks will be apparent to one skilled in the art given the benefit of this disclosure.

It should be understood that the elements set forth in FIG. 2 are illustrative. The consumer electronic device 110 can include any number of elements and certain elements can provide part or all of the functionality of other elements. For example, the much of the functionality of the reader 200, output interface 230, and input interface 240 can be performed by the processor 210 or multiple general or dedicated processors. Likewise, network connectively can be implemented separate from either the output interface 230 or the input interface 240. Other possible implementation will be apparent to on skilled in the art given the benefit of this disclosure.

Figure 3:
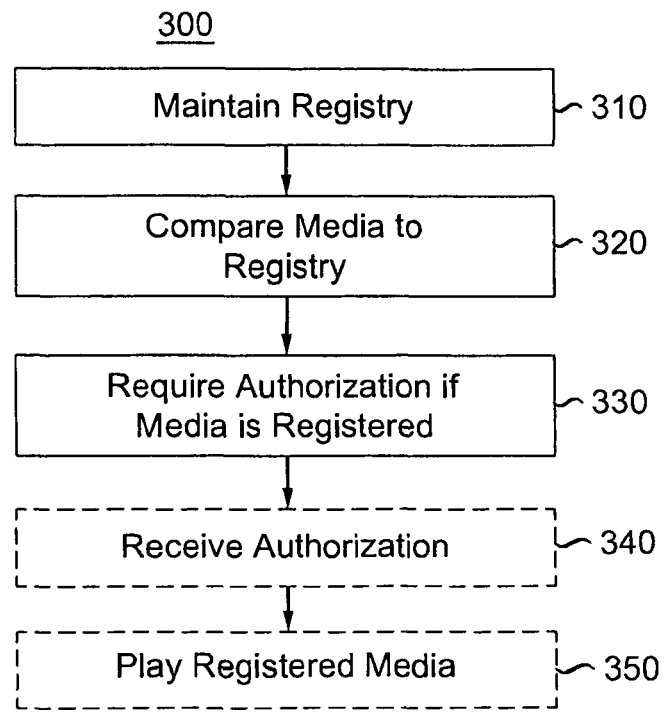
FIG. 3 is a flow diagram illustrating a methodology in accordance with one embodiment.

FIG. 3 is a flow diagram depicting a method 300 for the registry and authorization of media. At its most basic, the method involves three steps. The first step is receiving a maintaining a registry of registered media (step 310). Media can then be compared to the maintained registry of registered media (step 320). If the media is registered, then authorization is required to play the registered media based on the registration of the media (step 330). In certain embodiments, the method can further include the steps of receiving authorization (step 340) and playing the registered media upon receipt of authorization (step 350). Each of these steps will be discussed in more detail below.

Figure 4:
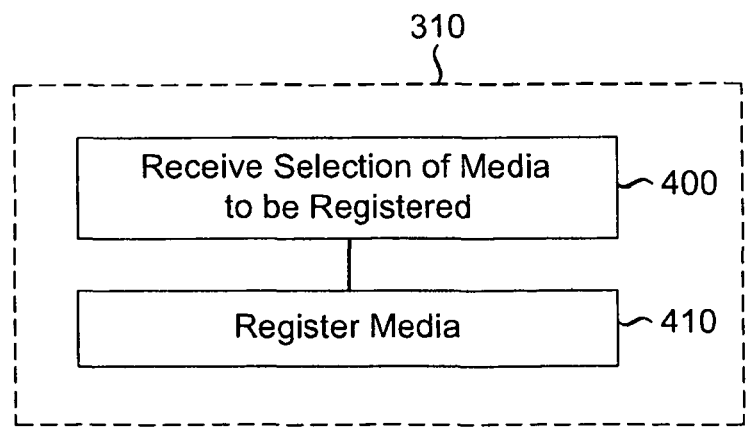
FIG. 4 is a flow diagram illustrating additional steps of a methodology in accordance with an embodiment.

In step 310, a registry of registered media is maintained. The registry includes a listing of all the media registered with the media player. In the example where the media player 110 is a DVD player, the registry can include all the DVDs that are registered with the DVD player. In the example where the media player 110 is configured to stream media, the registry can include all the streaming media files that are registered with the media player 110. The maintaining of the registry includes the storage of as well as the addition and subtraction of media to and from the registry. An example of this can be seen in FIG. 4, In FIG. 4, the step of maintaining a registry of registered media (step 310) is shown to comprise the step of receiving a selection of media to be registered (step 400) and registering the selected media (step 410). These steps are discussed in more detail below.

The selection of media can be received from a user directly, for example thru on-screen menus. Alternately, the selection of media for registration can be performed by a user remotely, for example over the internet. In another embodiment, the media selected for registration can be part of a list. For example, a listing of DVDs that are unsuitable for children can be supplied by consumer watch groups that can be downloaded or otherwise inputted to the media player 110.

Once the selection of media is received (in step 400) the selected program is then registered (step 320). The registration can be automatic upon receiving the selection of media. Alternatively, the registration can be selected by the user, for example though a menu of an on-screen display. The registration of the media indicates how the program should be handled in when attempting to play the registered media. In one embodiment the registration indicates that the program is restricted meaning the media is not suitable for general viewing. For example, media having mature themed content can be registered as private indicating that the media should not be played without authorization.

Conversely the registration can indicate that the media is preferred meaning that the media requires little or no authorization to be played. For example, media having content suitable for children can be registered as "Kid Safe" indicating that the media can be played without requiring authorization.

In other embodiments, the registration of media can indicate a requirement of a specific authorization. For example, a program can be registered to indicate that the media should only be playable for a particular user. In other embodiments, such as the example of FIG. 1B, where multiple display devices 120, 122, and 124 are connected to the media player 110; a program can be registered to indicate what display device 120, 122, 124 is authorized to play the media. Thus, certain programs could be registered so as to only play on a bedroom television, while other programs could be registered so as to only appear on the family room television. Other possible registration will be apparent to on skilled in the art given the benefit of this disclosure.

Figure 5A:
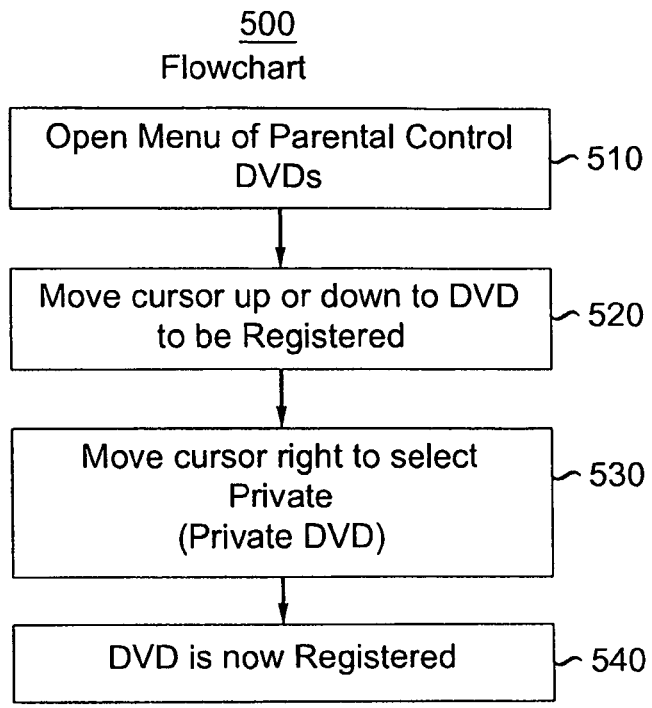
FIG. 5A is a flow diagram illustrating additional steps of a methodology in accordance with another embodiment.
Figure 5B:
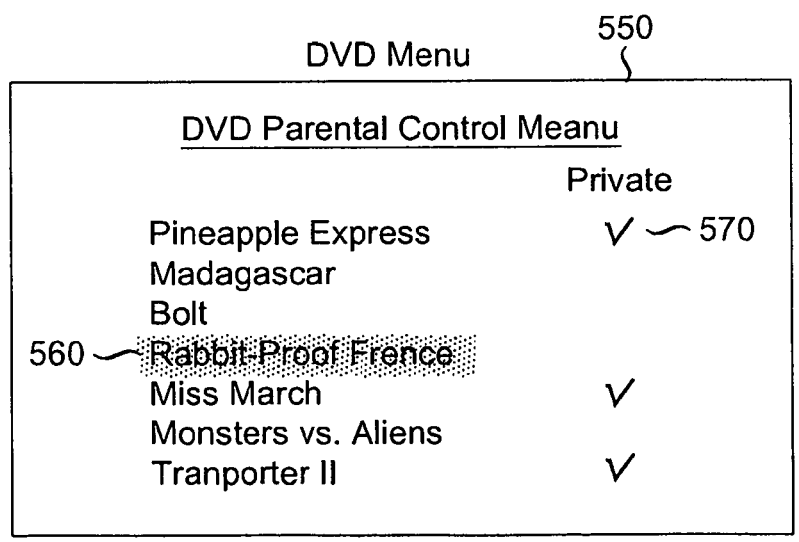
FIG. 5B is diagram depicting an on-screen menu relating to the flow diagram of FIG. 5A.

FIGS. 5A and 5B show an embodiment of the interworkings of the steps of receiving a selection of media to be registered (step 400) and registering the selected media (step 410). FIG. 5A depicts a flow diagram 500 of the process of how media is selected and registered using the onscreen DVD parental control menu 550 of FIG. 5B. After the DVD parental control menu 550 has been opened (step 510), the cursor 560 is moved up or down in the menu 550 to select a DVD to be registered (step 520). In this case, the DVD "Rabbit Proof Fence" has been selected using the cursor 560. The cursor can then be moved right or left to select the type of registration desired (step 530). In this case the option for registration is "Private" 550. The "Private" tag indicates the media is for private viewing only. Once a desired option is selected (step 530) the program is registered (step 540). In the example of FIG. 5B, the registration of media as "Private" is indicated by a check mark, thus check mark 570 indicates that the DVD "Pineapple Express" has been registered as "Private"

In some embodiments, the maintaining of the registry can require authorization. For example, parents can want to restrict the ability to add or remove media from the registry. As such, the registration of media by a user as depicted in FIGS. 5A and 5B can require that the user provide a password before the registration can be performed. This can be implemented similar to parental lock features currently found televisions and set top boxes. In another embodiment, such as the example of FIG. 1B, where multiple display devices 120, 122, and 124 are connected to the media player 110; the media player can be configured such that the registration of media can only be performed through designated devices such as set top box 160 or display device 124.

Referring back to FIG. 3, after the selected program has been registered (step 320), authorization is required to play the registered media based on the registration (step 330). For example, media registered as "Private" can only be viewed upon the user providing a password. This can be implemented similar to parental lock features currently found televisions and set top boxes. Conversely, if media has been registered as preferred, such as "Kid Safe," little or no authorization can be required to play the registered media.

In another embodiment, such as in FIG. 1B, where multiple display devices 120, 122, and 124 are connected to the media player 110; the media player 110 can be configured such that certain registered media can only be played on designated devices such as set top box 160 or display device 124. For example, programs tagged "private" can only be played a designated display device which has been authorized to display the registered media.

In still other embodiments, authorization can possess a temporal aspect. That is, authorization to play registered media can depend on the time of day. Thus, in the case of FIGS. 5A and 5B wherein media have been tagged as "Private" the authorization to play the media registered as "Private" can change based on the time of day. For example, in the hours between 5 A.M. and 8 P.M., when children are the primary user of the media player, the media registered as "Private" will not play, however, after 8 P.M when the children are in bed, the media registered as "Private" will be authorized to be played.

In certain embodiments, the method 300 of FIG. 3 further includes the steps of receiving authorization (step 340) and playing the media upon receipt of authorization (step 350). As set forth above, the authorization can be provided as a password or a request to play the registered media from and authorized device or at an authorized time. Playing the registered media is performed by outputting the content of the registered media from the media player 110 to a display device 120, 122, 124. In embodiment where the media player 110 includes its' on display device, the content of the registered media can be displayed on the included display device.

It should be understood that the set-up and management of the registry as well as authorizations, including passwords, designated devices, and temporal aspects can be performed by the user as needed. For example, on-screen menus can be provided to a user to configure or modify any of these aspects. In certain embodiments on-screen prompts can be provided to the user. An example of this can be seen in FIG. 6.

Figure 6:
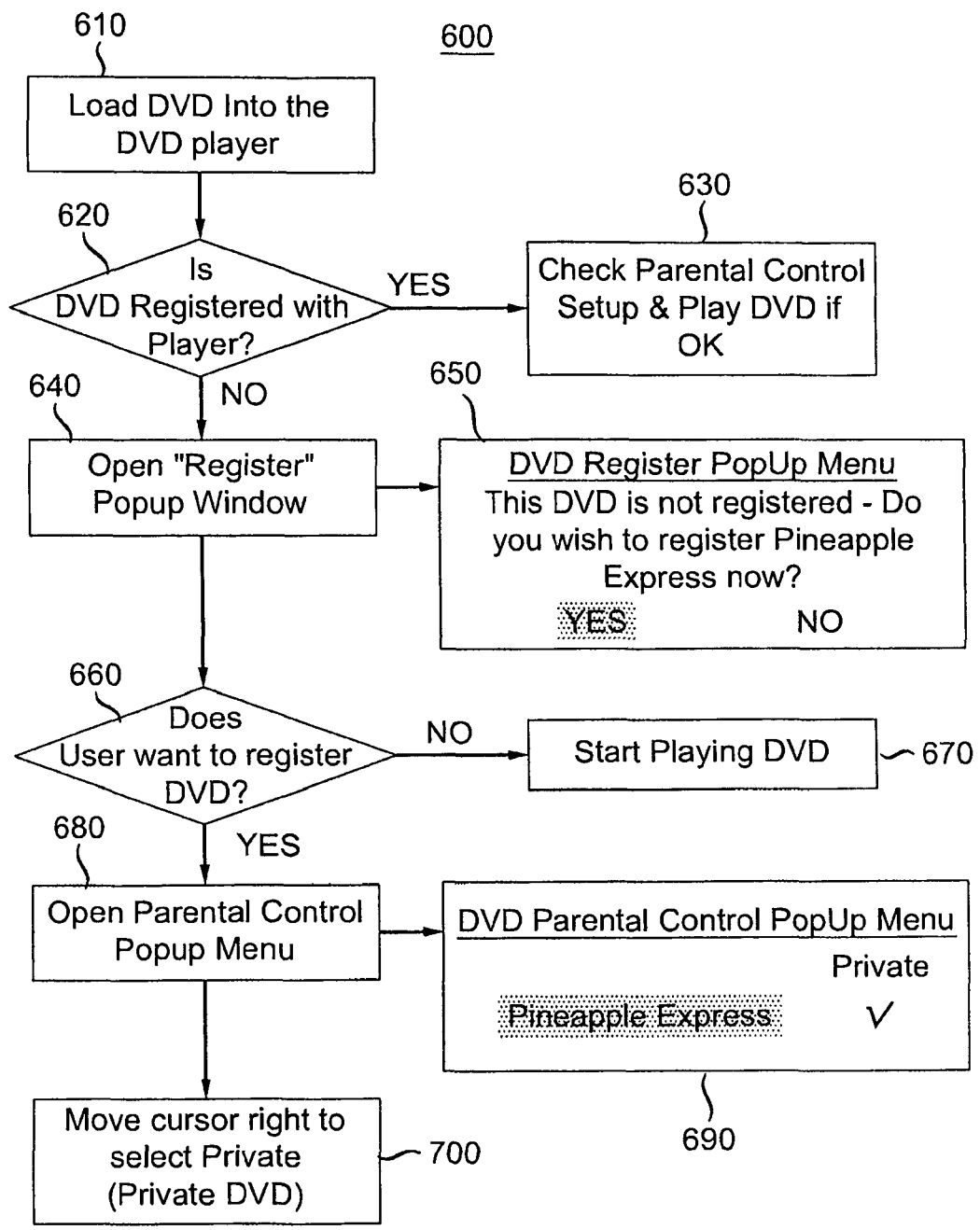
FIG. 6 is a flow diagram illustrating additional steps of a methodology in accordance with an embodiment.

FIG. 6 depicts a flow diagram 600 of one embodiment of the process of registering media with a media player. In this example, the media player is a DVD player and the media being registered is a DVD. The process begins with the DVD being loaded into the player (step 610). The DVD player then checks to see if the DVD has been registered with the player (step 620). If the DVD has been registered, the required authorization is determined and if authorized the DVD is played (step 630). If the DVD has not been registered, a pop-up window 650 prompting registration is opened (step 640). Using the pop-up window, the user selects whether or not to register the DVD (step 660). If the user selects not to register the DVD, the DVD can begin playing (step 670). If the user selects to register the DVD with the player, a registration pop-up menu 690 is provided (step 680). Using the pop-up menu 690, the user can then select the type of registration, in this case "Private" (step 700).

While the example set forth above has focused on an electronic device, it should be understood that the present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

The invention claimed is:

1. In a media player, a method comprising:
maintaining a registry of registered media
comparing media to the maintained registry of registered media
requiring authorization to play the media based on the registration of the media in the maintained registry, wherein the authorization is based on a device displaying the media being played by the media player and the authorization determines whether the device is authorized to display the registered media.

2. The method of claim 1, further comprising the steps of:
receiving authorization for a registered media; and
playing the registered media responsive to said authorization.

3. The method of claim 1, wherein the step of maintaining a registry of registered media comprises:
receiving a selection of a media to be registered; and
registering the selected media.

4. The method of claim 3, wherein the step of receiving a selection of a media to be registered comprises receiving, from a user, a selection of a media to be registered.

5. The method of claim 4, wherein the received selection of a media to be registered is received from a user via an on-screen menu.

6. The method of claim 5, the step of receiving a selection of media to be registered further comprises the steps of:
providing and on-screen prompt for a selection of media, and
receiving a selection of media provided by a user via an on-screen menu.

7. The method of claim 3, wherein the selection of a media to be registered is received via a network connection of the media player.

8. The method of claim 3, wherein the step of receiving a selection of a media to be registered comprises receiving a list of media to be registered.

9. The method of claim 3, wherein the step of registering the received selected media comprises registering the received selected media as restricted.

10. The method of claim 3, wherein the step of registering the received selected media comprises registering the received selected media as preferred.

11. The method of claim 1, wherein the media player is a network based media player.

12. A media player comprising:
a reader configured to read media provided to the media player
a processor configured to maintain a registry of registered media, compare a media to the maintained registry of registered media and require authorization to play registered media based on the registration of the media, wherein the authorization is based on a device displaying the media being played by the media player and the authorization determines whether the device is authorized to display the registered media;
storage for storing the maintained registry of registered media;
an output interface for outputting the content of an authorized media.

13. The media system of claim 12, further comprising a network interface.

14. The media system of claim 12, further comprising an input interface for receiving input from a user.

15. The media system of claim 14, wherein the input interface is further configured to receive authorization for the playing of registered media.

16. The media system of claim 12, wherein the processor is further configured to receive authorization for a registered media and play the registered media responsive to said authorization.

17. The media system of claim 12, wherein the processor is further configured to maintain the registry of registered media by receiving a selection of a media to be registered and registering the selected media.

18. The media system of claim 17, wherein receiving a selection of a media to be registered comprises receiving a list of media to be registered.

19. The media system of claim 17, wherein registering the received selected media comprises registering the received selected media as restricted.

20. The media system of claim 17, wherein registering the received selected media comprises registering the received selected media as preferred.

* * * * *